United States Patent [19]

Putt et al.

[11] 4,206,269

[45] Jun. 3, 1980

[54] METAL-HALOGEN BATTERY ASSEMBLY AND METHOD OF OPERATION

[75] Inventors: Ronald A. Putt, Palatine; Mark J. Montgomery, Lake Zurich, both of Ill.

[73] Assignee: Electric Power Research Institute, Inc., Palo Alto, Calif.

[21] Appl. No.: 966,900

[22] Filed: Dec. 6, 1978

[51] Int. Cl.$^2$ .............................................. H01M 8/04
[52] U.S. Cl. ......................................... 429/15; 429/29; 429/50; 429/70; 429/105; 429/229
[58] Field of Search ................... 429/50, 101, 105, 15, 429/29, 229–231, 70, 199

[56] References Cited

U.S. PATENT DOCUMENTS

| | | | |
|---|---|---|---|
| 3,414,437 | 12/1968 | Doundoulakis et al. | 429/101 X |
| 3,972,727 | 8/1976 | Cohn | 429/229 X |
| 4,065,601 | 12/1977 | Ajami | 429/50 |
| 4,105,829 | 8/1978 | Venero | 429/50 X |
| 4,133,941 | 1/1979 | Sheibley | 429/101 X |

*Primary Examiner*—Charles F. Lefevour
*Attorney, Agent, or Firm*—Flehr, Hohbach, Test

[57] ABSTRACT

A metal-halogen battery assembly, specifically a zinc-bromine battery assembly of the rechargeable type, is disclosed herein along with its method of operation. The assembly includes a housing having an internal chamber, a liquid separator or membrane which divides the chamber into two sections, a metal-reacting negative section and a halogen-reacting positive section, and two electrodes, a negative electrode fixedly located within the metal-reacting chamber section and a positive electrode fixedly located within the halogen-reacting chamber section. The assembly also includes metal and halogen containing electrolyte solution, a first fixed volume of which is continuously circulated and recirculated through the negative chamber section while a separate, lesser volume of the solution is circulated and recirculated through the positive chamber section.

7 Claims, 1 Drawing Figure

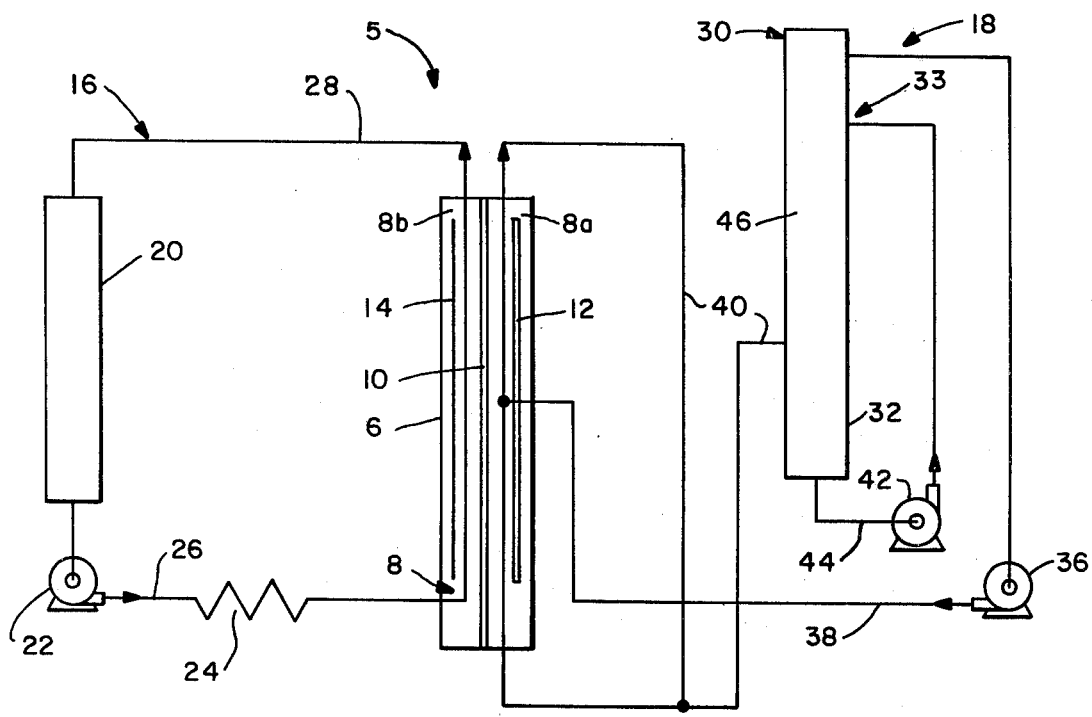
FIG.—1

METAL-HALOGEN BATTERY ASSEMBLY AND METHOD OF OPERATION

BACKGROUND OF THE INVENTION

The present invention relates generally to metal-halogen battery assemblies and more particularly to a technique for improving the operation of a metal-halogen battery assembly of the rechargeable type such as the assembly disclosed in Applicant's copending U.S. Patent Application Ser. No. 841,391 which was filed Oct. 12, 1977 now U.S. Pat. No. 4,162,351 and which was assigned to the Assignee of the present application.

Applicant's copending application just recited discloses an overall metal-halogen battery system of the rechargeable type and specifically to an improved technique for reversibly complexing the halogen in such systems, particularly in a zinc-bromine system. This system, as described in the application, includes a positive electrode (the bromine electrode) and a negative electrode (the zinc electrode) which are respectively located within two sections of a housing or cell chamber appropriately divided by a suitable separator. In order to minimize the formation of zinc dendrites, the particular system disclosed utilizes continuously circulating aqueous electrolyte solution which contains bromide ions. Moreover, because the electrolyte on the negative electrode side of the separator must typically have a much lower bromine concentration than the electrolyte on the positive electrode side, two separate flow loops have been provided, the electrolyte in each loop making many passes through its respective chamber section during a single charge-discharge cycle. For a number of reasons described in the copending application, this battery system utilizes a complexing agent for adding bromine to the positive electrolyte solution circulated through the positive chamber section. The bromine is added by means of a polybromide oil phase which is located outside the battery chamber.

While the battery system described in copending application, Ser. No. 841,391 is satisfactory in most respects, Applicants have discovered room for improvement. For example, in the system described, a supporting electrolyte, specifically potassium chloride, is preferably used. Potassium chloride has a strong effect on the apparent transference number of the zinc species. Specifically in an acidic solution of concentrated chloride ions, the zinc ions are predominantly in zinc-polychloro complexes ($ZnCL_4^=$. Since the net charge on these ions is negative, their direction of migration in an electrical field is opposite to that of an uncomplexed cation and hence they migrate through the separator from the negative electrolyte to the positive electrolyte during cell charging, thereby resulting in a depletion of the zinc ion concentration on the negative side. At the same time, the bromide ions behave as anions, and thus also migrate from the negative side to the positive side during the charge cycle. Moreover, the bromine partition properties of the complexing agent used to store bromine in a second liquid phase, specifically the polybromide oil, are poorer in high bromide ion concentration which Applicants have found specifically exists in cells with equal distributions of electrolyte on each side of the separator, that is, in each separate loop.

As will be described in detail hereinafter, in order to overcome the drawbacks just recited, Applicants have found that the overall system should be designed so that the negative electrolyte loop includes more electrolyte solution by volume than the positive loop and preferably as large a fraction as possible of the total electrolyte solution. This has several advantages. First, most of the zinc ions are already on the correct side, that is, the negative side, and migration to the positive side during charge will result in a more rapid concentration on the positive side, thereby enhancing back-diffusion to the negative side and increasing its fraction of utilization. At the same time, the bromide ion concentration on the positive side during the charging cycle will be depressed, resulting in better performance of the complexing agent with respect to the bromine partition. On the other hand, during the discharge cycle, the bromide ion concentration will be large, which will drive the bromine into the aqueous phase at an enhanced rate, which is desirable for efficient discharge. To these ends, the volume of electrolyte on the positive side would ideally be just enough to fill the plumbing plus a small surge volume, that is, just enough to support circulation through the positive loop.

OBJECTS AND SUMMARY OF THE INVENTION

One object of the present invention is to provide a battery assembly of the general type described above, but one which more efficiently utilizes a lesser volume of electrolyte solution by means of an uncomplicated, economical and yet reliable technique.

A more particular object of the present invention is to provide a metal-halogen battery assembly of the rechargeable type, specifically a zinc-bromine assembly in a preferred embodiment, which utilizes separate positive and negative electrolyte loops and which is specifically designed to increase utilization of its metal (zinc) ions.

Another particular object of the present invention is to provide the metal-halogen battery assembly just recited and particularly one which is designed to display improved performance of its complexing agent during the charge cycle.

Still another particular object of the present invention is to provide the metal-halogen assembly just recited and particularly one which displays an efficient discharge cycle.

As will be described in more detail hereinafter, the battery assembly disclosed herein is a metal-halogen assembly of the rechargeable type, specifically a zinc-bromine battery assembly in a preferred embodiment. This assembly includes a housing having an internal chamber, liquid separator means located within the chamber for separating the latter into positive and negative sections and positive and negative electrodes fixedly located within the positive and negative chamber sections, respectively. The assembly also includes separate halogen-containing electrolyte solution associated with each of the chamber sections and means for continuously circulating and recirculating the separate electrolyte solutions through their respective chamber section during operation of the battery assembly.

In accordance with the present invention, the battery assembly just described is designed so that the electrolyte loop associated with the positive chamber section, that is, with the positive electrode, includes less electrolyte solution by volume than is provided in the negative loop. In a preferred embodiment, the difference in volume is maximized by providing only enough electrolyte solution in the positive loop to support continuous circulation through the positive chamber section by the circulating means. A number of advantages result from this electrolyte imbalance. First, metal ion migration (zinc ion migration in the case of a zinc-bromine assembly) to the positive side during the charging cycle will result in a more rapid concentration of metal ions on the positive side than would be the case if the assembly were balanced, that is, if the assembly included equal amounts of electrolyte solution by volume on the positive and negative sides. This more rapid increase in ion concentration will, in turn, enhance back-diffusion to the negative side, thereby increasing the fraction of utilization of zinc ions. At the same time, that is, during the charging cycle, the halogen (bromide) ion concentration during the charging cycle will be depressed, resulting in better performance of the complexing agent with respect to halogen (bromine) partition. On the other hand, during the discharge cycle the halogen (bromide) ion concentration will be large, which will drive halogen into the aqueous phase at an enhanced rate, resulting in a more efficient battery discharge cycle.

BRIEF DESCRIPTION OF THE DRAWING

FIG. 1, the sole FIGURE provided herein, schematically illustrates a zinc-bromine battery assembly designed in accordance with the present invention.

DETAILED DESCRIPTION

Turning to the drawing, FIG. 1 schematically illustrates a zinc-bromine battery assembly designed in accordance with the present invention. With one exception to be discussed hereinafter, this overall battery assembly generally indicated by the reference numeral 5 may be identical to the zinc-bromine cell system described in copending application Ser. No. 841,391 discussed previously. Accordingly, assembly 5 includes an overall cell housing 6 having an internal chamber 8 which is divided into two sections, a positive chamber section 8a and a negative chamber section 8b by means of a separator 10. The assembly also includes a positive electrode 12 (the bromine reacting electrode) fixedly located within chamber section 8a and a negative electrode 14 (the zinc reacting electrode) fixedly located within chamber section 8b.

In order to minimize the formation of zinc dendrites, assembly 5 utilizes a circulating electrolyte system. Since the electrolyte on the negative electrode side of the separator must typically have a much lower bromine concentration than the electrolyte on the positive electrode side, two separate flow loops, a negative loop and a positive loop generally indicated at 16 and 18, respectively, are provided. Generally, in a system of this type, the electrolyte is provided under constant circulation and recirculation, making many passes through the housing during a single charge-discharge cycle.

As seen in FIG. 1, the negative loop 16 includes an electrolyte solution reservoir 20, a pump 22 and a heat exchanger 24 for the electrolyte solution. This solution is pumped from the resevoir through line 26 and into chamber section 8b adjacent the bottom thereof. The electrolyte is passed across the face of electrode 14 and is returned to the resevoir via line 28 exiting the chamber section its top end for concluding the circulation loop. The positive loop 18 includes an external arrangement for storing bromine in the form of polybromide oil which is utilized in conjunction with the electrolyte solution, the latter being composed of zinc bromide (the electro-chemically active species), potassium chloride (the supporting electrolyte), and water (the solvent). In order to enhance the rate of transport between the oil and electrolyte phases at current densities that would be satisfactory for most applications, the overall assembly uses a liquid-liquid contacting housing device 30 containing the polybromide oil (not shown) at its bottom end 32. The electrolyte solution provided in positive loop 18 is circulated by means of a pump 36 from the contacting device 30 to chamber section 8a via line 38 and from this chamber section back to the device 30 through lines 40. In order to achieve the necessary mechanical agitation for statisfactory mass transport characteristics in this embodiment, a pump 42 (or other suitable means) is provided for removing the oil from adjacent the bottom of contacting device 30 via line 44 and reintroduces the oil in droplet form into the device 30 through a nozzle (not shown) at 33.

Battery assembly 5 including its individual components thus far described may be identical in structure and general operation to the assembly described in the above recited copending application. In other words, the positive and negative electrodes, the separator and the liquid-liquid contacting device as well as the other components making up the negative and positive loops of assembly 5 may be identical to the corresponding components described in the recited copending application. Accordingly, a detailed discussion of these components and the general method of operation of the overall battery assembly will not be provided herein, reference being made to the copending application. For purposes of the present invention, it suffices to say that the electrolyte solution circulated through loop 16 is of fixed volume (discounting losses through use and as negligible) and continuously circulates and recirculates through chamber section 8b at a particular flow rate, for example between 1 ml/s and 10 ml/s, preferably 5 ml/s, during operation of the overall assembly. At the same time, the electrolyte solution in loop 18 is also of fixed volume and is circulated and recirculated through chamber section 8a at the same flow rate during operation of the assembly.

The only difference between battery assembly 5 in the particular embodiment illustrated and the zinc-bromine cell system described in the copending application is that the amount of electrolyte solution (by volume) in the positive loop 18 of assembly 5 is less than the amount of electrolyte solution (again by volume) provided in negative loop 16. In a preferred embodiment, this difference is maximized. More specifically, the amount of electrolyte solution by volume provided in loop 18 is minimized to the point that it just barely supports circulation through the loop or to point that the overall battery operation is not adversely affected. In an actual working embodiment, of the total amount of electrolyte solution within the assembly, approximately 75% was provided in loop 16 while 25% was provided in loop 18. Test operation of this cell was compared with one which included equal amounts of electrolyte solution in the two loops. It was found that cell efficiency was approximately the same for the test in which its positive side electrolyte volume was reduced (relative to the negative side) and the tests in which larger positive electrolyte volumes existed. Thus, a greater fraction of utilization of zinc ions and, hence, more efficient utilization of electrolyte solution was made possible (in the first-mentioned test) without any penalty in operational performance.

While overall battery assembly 5 has been described as a zinc-bromine assembly, it is to be understood that the advantages attained by the present invention are equally applicable to other metal-halogen batteries of the general type described including, for example zinc-chlorine battery assemblies. Moreover, while the various components making up assembly 5 may be identical to those described in the previously recited copending application, it is to be understood that the present invention is not limited to the particular components so long as the components selected are compatible with the present invention.

What is claimed is:

1. A zinc-halogen battery assembly comprising a housing including an internal chamber, means located within said chamber for separating the latter into positive and negative chamber sections, a positive halogen-reacting electrode and a zinc containing negative chamber sections, respectively, fixed volumes of positive and negative electrolyte solutions, each containing a specific halogen, said positive solution being of lesser volume than said negative solution, and means for continuously circulating and recirculating said positive and negative solutions through said positive and negative chamber sections, respectively, during operation of the assembly.

2. An assembly according to claim 1 wherein the volume of said positive electrolyte solution is the minimum necessary to support continuous circulation through said positive chamber section by said circulating means.

3. An assembly according to claim 1 wherein said positive electrolyte solution is not more than 40% by volume of the total volume of said positive and negative solutions.

4. An assembly according to claim 1 wherein said solutions are circulated at a flow rate of between 1 ml/s and 10 ml/s.

5. A zinc-bromine battery arrangement comprising a housing including an internal chamber and means located within said chamber for separating the latter into positive and negative sections, respectively, a bromine reacting positive electrode and a zinc containing negative electrode fixedly located within said positive and negative chamber sections, respectively, positive and negative aqueous electrolyte solutions including zinc bromide, said positive solution being of lesser total volume than such negative solution, first means for circulating said positive solution through said positive chamber section and second means for circulating said negative solution through said negative chamber section.

6. A method of operating a zinc-halogen battery assembly including a housing having an internal chamber, means located within said chamber for separating the latter into positive and negative sections, a halogen-reacting positive electrode and a zinc-containing negative electrode fixedly located within said positive sections, respectively, said method comprising continuously circulating and recirculating a fixed volume of positive electrolyte solution containing a halogen through said positive chamber section during operation of the assembly and simultaneously circulating and recirculating a greater volume of negative electrolyte solution containing a halogen through said negative chamber section.

7. In a zinc-halogen battery assembly including a housing containing an internal chamber, means located within said chamber for separating the latter into positive and negative chamber sections, a positive halogen-reacting electrode and negative zinc electrode fixedly located within said positive and negative chamber sections, respectively, fixed volumes of positive and negative electrolyte solutions, each containing a specific halogen and means for continuously circulating and recirculating said positive and negative solutions through said positive and negative chamber sections, respectively, during operation of the assembly, the improvement comprising the utilization of a lesser volume of said positive electrolyte solution than said negative solution.

* * * * *